(12) United States Patent
Uehara et al.

(10) Patent No.: US 6,868,304 B2
(45) Date of Patent: Mar. 15, 2005

(54) MULTI-FUNCTION MACHINE TOOL AND MACHINING METHOD IN MULTI-FUNCTION MACHINE TOOL

(75) Inventors: Masaya Uehara, Nara (JP); Miwako Yuhara, Nara (JP)

(73) Assignee: Mori Seiki Hitech Co., Ltd., Yamatokoriyam (JP)

( * ) Notice: Subject to any disclaimer, the term of this patent is extended or adjusted under 35 U.S.C. 154(b) by 0 days.

(21) Appl. No.: 10/670,197

(22) Filed: Sep. 26, 2003

(65) Prior Publication Data

US 2004/0254671 A1 Dec. 16, 2004

(30) Foreign Application Priority Data

Sep. 26, 2002 (JP) ........................................ 2002-281383

(51) Int. Cl.[7] ............................................. G06F 19/00
(52) U.S. Cl. ........................ 700/159; 700/95; 700/117; 483/46; 82/138
(58) Field of Search ........................... 700/95, 117, 156, 700/169, 172, 179; 82/138, 149; 409/166.99, 134; 438/17, 26, 39; 29/27 C, 558

(56) References Cited

U.S. PATENT DOCUMENTS

| | | | | |
|---|---|---|---|---|
| 4,354,305 A | * | 10/1982 | Plummer et al. | ............. 483/31 |
| 5,052,089 A | * | 10/1991 | Gadaud et al. | ............. 29/27 R |
| 5,636,949 A | * | 6/1997 | Nakamura et al. | ........... 409/230 |
| 5,775,853 A | * | 7/1998 | Keefer et al. | ................ 408/1 R |
| 2003/0182014 A1 | * | 9/2003 | McDonnell et al. | ......... 700/159 |

FOREIGN PATENT DOCUMENTS

| JP | 6-506640 | 7/1994 |
|---|---|---|
| JP | 3170790 | 3/2001 |

* cited by examiner

*Primary Examiner*—Kidest Bahta
(74) *Attorney, Agent, or Firm*—Westerman, Hattroi, Daniels & Adrian, LLP

(57) ABSTRACT

The multi-function machine tool of the present invention has a tool rest main body which is disposed movably relative to the main spindle of the machine tool in a first linear direction parallel to the axial line of the main spindle and a second linear direction perpendicular to the axial line of the main spindle, a turning tool rest 72 which is disposed so that this turning tool rest can turn relative to the tool rest main body about a turning axis 73 oriented in a direction that is perpendicular to the first and second linear directions, and control means which control the rotational motion of the main spindle, the turning motion of the turning tool rest about the turning axis, and the relative motion of the tool rest main body. Furthermore, the control means can cause the turning tool rest to perform a turning motion about an arbitrary position that differs from the position of the turning axis by concurrently and synchronously causing a turning motion of the turning tool rest about the turning axis, and a circular-arc motion based on the relative motion of the tool rest main body in the first linear direction and second linear direction.

15 Claims, 12 Drawing Sheets

(a)

(b)

(c)

(d)

MULTI-FUNCTION MACHINE TOOL AND MACHINING METHOD IN MULTI-FUNCTION MACHINE TOOL

BACKGROUND OF THE INVENTION

1. Field of the Invention

The present invention relates to a multi-function machine tool in which a workpiece held by workpiece attachment means on the tip end of a rotatable main spindle is machined by a tool mounted on a turning tool rest that is capable of a turning motion and a linear motion in two or more directions, and a machining method of this multi-function machine tool; more particularly, the present invention relates to a multi-function machine tool which can machine helical grooves of diverse shapes in the workpiece, and a machining method of this multi-function machine tool.

2. Description of the Related Art

The techniques described in Japanese Patent Publication No. H6-506640 (International Publication No. WO92/18278) and Japanese Patent Application Laid-Open No. 3170790 and the like (described later) are known as methods for machining helical grooves of complex shapes in workpieces. A method for forming helical grooves in a screw compressor by rotating the workpiece and rotating the tool is described in Japanese Patent Publication No. H6-506640. However, the machine tool used to carry out this method is a special tool, and arbitrary setting of the groove width, groove radius (rotating radius of the tool), groove cross-sectional shape and the like is difficult. Furthermore, since a special tool must be introduced in order to perform this machining, the cost of machining is increased.

A method for machining cam grooves in a roller cam by rotating the workpiece, rotating a table and moving the tool in the directions of the X axis and Y axis is described in Japanese Patent Application Laid-Open No. 3170790. Here, however, there is no concrete description of exactly how the rotating of the table and the movement of the tool in the directions of the X axis and Y axis are performed in order to machine grooves of a desired shape, and it is unclear exactly what type of NC machining program is necessary for the actual machining of grooves. Accordingly, it is necessary to calculate the movement track of the tool used to machine the desired shape and the like by means of a computer or the like, and the actual NC machining program must be prepared from the results of these calculations.

Thus, in order to machine helical grooves of complex shapes in a workpiece, it has conventionally been necessary to use a special tool, which has led to an increase in machining costs; furthermore, it has been difficult to set the groove width, groove radius, groove cross-sectional shape and the like at arbitrary values. Moreover, in the case of machine tools in which the machining of grooves is performed by combining the rotating of the table and the movement of the tool along the X and Y axes, calculation of the movement path of the tool is complicated.

SUMMARY OF THE INVENTION

Accordingly, the present invention relates to a multi-function machine tool which makes it possible to machine helical grooves of diverse shapes in a workpiece using an all-purpose multi-function machine tool, and a machining method in this multi-function machine tool.

In order to achieve the abovementioned object, the multi-function machine tool of the present invention is a multi-function machine tool comprising a main spindle which is rotatably disposed on the bed of the machine tool, and has workpiece attachment means for attaching the workpiece on the tip end thereof, a tool rest main body which is disposed movably in relative terms in a first linear direction parallel to the axial line of the abovementioned main spindle, and in a second linear direction perpendicular to the abovementioned first linear direction, a turning tool rest which is disposed on the abovementioned tool rest main body, allows the mounting of a tool, and is disposed so that this tool rest can turn relative to the abovementioned tool rest main body about a turning axis which has an axial line oriented in a direction that is perpendicular to both the abovementioned first linear direction and the abovementioned second linear direction, and control means for controlling the rotational motion of the abovementioned main spindle about the axial line of the abovementioned main spindle, the turning motion of the abovementioned turning tool rest about the axial line of the abovementioned turning axis, and the relative motion of the abovementioned main spindle and the abovementioned tool rest main body in the abovementioned first linear direction and the abovementioned second linear direction, wherein the abovementioned control means can cause the turning motion of the abovementioned turning tool rest about an arbitrary position that differs from the position of the above-mentioned turning axis by concurrently and synchronously causing a turning motion of the abovementioned turning tool rest about the abovementioned turning axis, and a circular-arc motion based on the relative motion of the abovementioned tool rest main body in the abovementioned first linear direction and the abovementioned second linear direction.

Furthermore, in the abovementioned multi-function machine tool, it is desirable that the abovementioned tool rest main body be movably disposed relative to the abovementioned bed in the abovementioned first linear direction and the abovementioned second linear direction.

Furthermore, in the abovementioned multi-function machine tool, it is desirable that the abovementioned control means be able to accomplish the machining of helical grooves in the abovementioned workpiece by causing a rotational motion of the abovementioned workpiece about the axial line of the abovementioned main spindle concurrently and in synchronization with the abovementioned turning motion and the abovementioned circular-arc motion.

Furthermore, in the abovementioned multi-function machine tool, it is desirable that a plate-form bite as a tool that performs the machining of the abovementioned helical grooves can be mounted on the abovementioned turning tool rest.

Furthermore, in the abovementioned multi-function machine tool, it is desirable that a turning tool that performs turning on the abovementioned workpiece can be mounted on the abovementioned turning tool rest, and that the abovementioned control means can perform the abovementioned helical groove machining and the abovementioned turning of the above-mentioned workpiece as a continuous process.

Furthermore, in the abovementioned multi-function machine tool, it is desirable that the abovementioned turning tool rest comprise at least a first mounting part which detachably mounts a tool that performs the abovementioned helical groove machining, and a second mounting part which detachably mounts a turning tool that performs the abovementioned turning.

Furthermore, in the abovementioned multi-function machine tool, it is desirable that at least a milling tool that performs the rough machining of the abovementioned helical grooves, and a plate-form bite (it is intended that the term "bite" refers to a tool, cutting tool or turning tool) that performs the finishing machining of the abovementioned helical grooves can be mounted on the abovementioned turning tool rest.

Furthermore, in the abovementioned multi-function machine tool, it is desirable that the abovementioned turning tool rest comprise a rotatable tool main spindle, that a tool mounting part be disposed on the tip end portion of the abovementioned tool main spindle, and that the above-mentioned tool mounting part be capable of mounting the above-mentioned milling tool and the abovementioned plate-form bite.

Furthermore, in the abovementioned multi-function machine tool, it is desirable that the abovementioned tool mounting part comprise rotation regulating means that regulate the rotation of the abovementioned plate-form bite about the abovementioned tool main spindle when the abovementioned plate-form bite is mounted.

Furthermore, in the abovementioned multi-function machine tool, it is desirable that the abovementioned workpiece attachment means can attach the abovementioned workpiece in a position that is separated by a specified distance from the abovementioned main spindle toward the front on the axial line of the abovementioned main spindle, and that the machine tool be devised so that when the abovementioned turning tool rest is caused to perform a turning motion about an arbitrary position that differs from the position of the above-mentioned turning axis by concurrently and synchronously performing a turning motion of the abovementioned turning tool rest about the abovementioned turning axis and a circular-arc motion based on the relative motion of the abovementioned tool rest main body in the abovementioned first linear direction and the above-mentioned second linear direction, there is no interference between the abovementioned turning tool rest and splash guards which are disposed on the abovementioned bed, and which are devised so that splashing material generated inside the machining region does not splash to the outside of the machining region, or between the turning tool rest and the abovementioned bed itself.

Furthermore, the machining method of the multi-function machine tool of the present invention is a machining method in a multi-function machine tool comprising a main spindle which is rotatably disposed on the bed of the machine tool, and which has workpiece attachment means for attaching a workpiece on the tip end thereof, a tool rest main body which is disposed movably in relative terms in a first linear direction parallel to the axial line of the abovementioned main spindle, and in a second linear direction perpendicular to the abovementioned first linear direction, and a turning tool rest which is disposed on the abovementioned tool rest main body, allows the mounting of a tool, and is disposed so that this tool rest can turn relative to the abovementioned tool rest main body about a turning axis which has an axial line oriented in a direction that is perpendicular to both the abovementioned first linear direction and the above-mentioned second linear direction, this machining method comprising the steps of setting the center position of the turning motion that the abovementioned tool mounted on the above-mentioned turning tool rest is caused to perform in an arbitrary position that differs from the position of the abovementioned turning axis, determining the circular-arc motion based on the relative motion of the abovementioned tool rest main body in the abovementioned first linear direction and the abovementioned second linear direction that is necessary in order to cause the abovementioned tool to perform the abovementioned turning motion, and performing the machining of the abovementioned workpiece by causing the above-mentioned turning tool rest to perform a turning motion about the abovementioned turning axis, causing the abovementioned tool rest main body to perform the above-mentioned circular-arc motion concurrently and synchronously with the above-mentioned turning motion of the abovementioned turning tool rest, and causing the above-mentioned tool to perform the above-mentioned turning motion about the abovementioned center position.

Furthermore, in the abovementioned machining method of a multi-function machine tool, it is desirable that the abovementioned step of determining the above-mentioned circular-arc motion comprises a step of setting a first dimension from the center position of the turning motion that the abovementioned tool is caused to perform to the tip end position of the abovementioned tool, a step of determining a second dimension from the center position of the abovementioned turning motion to the center position of the abovementioned turning axis, and a step of determining the radius, starting position and end position of the abovementioned circular-arc motion from the above-mentioned second dimension and the starting angular position and end angular position of the turning motion that the above-mentioned tool is caused to perform.

Furthermore, in the abovementioned machining method of a multi-function machine tool, it is desirable that the step of performing the machining on the abovementioned workpiece be a step of forming a helical groove in the above-mentioned workpiece while the abovementioned workpiece is caused to perform a rotational motion about the axial line of the abovementioned main spindle concurrently and synchronously with the abovementioned turning motion and the above-mentioned circular-arc motion.

Furthermore, in the abovementioned machining method of a multi-function machine tool, it is desirable that the step of performing the machining on the abovementioned workpiece be a step of performing a turning motion and a circular-arc motion which have different phase relationships with respect to the rotational motion of the abovementioned workpiece, and performing groove machining with a groove width that is equal to or greater than the width of the blade part of the abovementioned tool.

DESCRIPTION OF THE PREFERRED EMBODIMENTS

Figure 1:
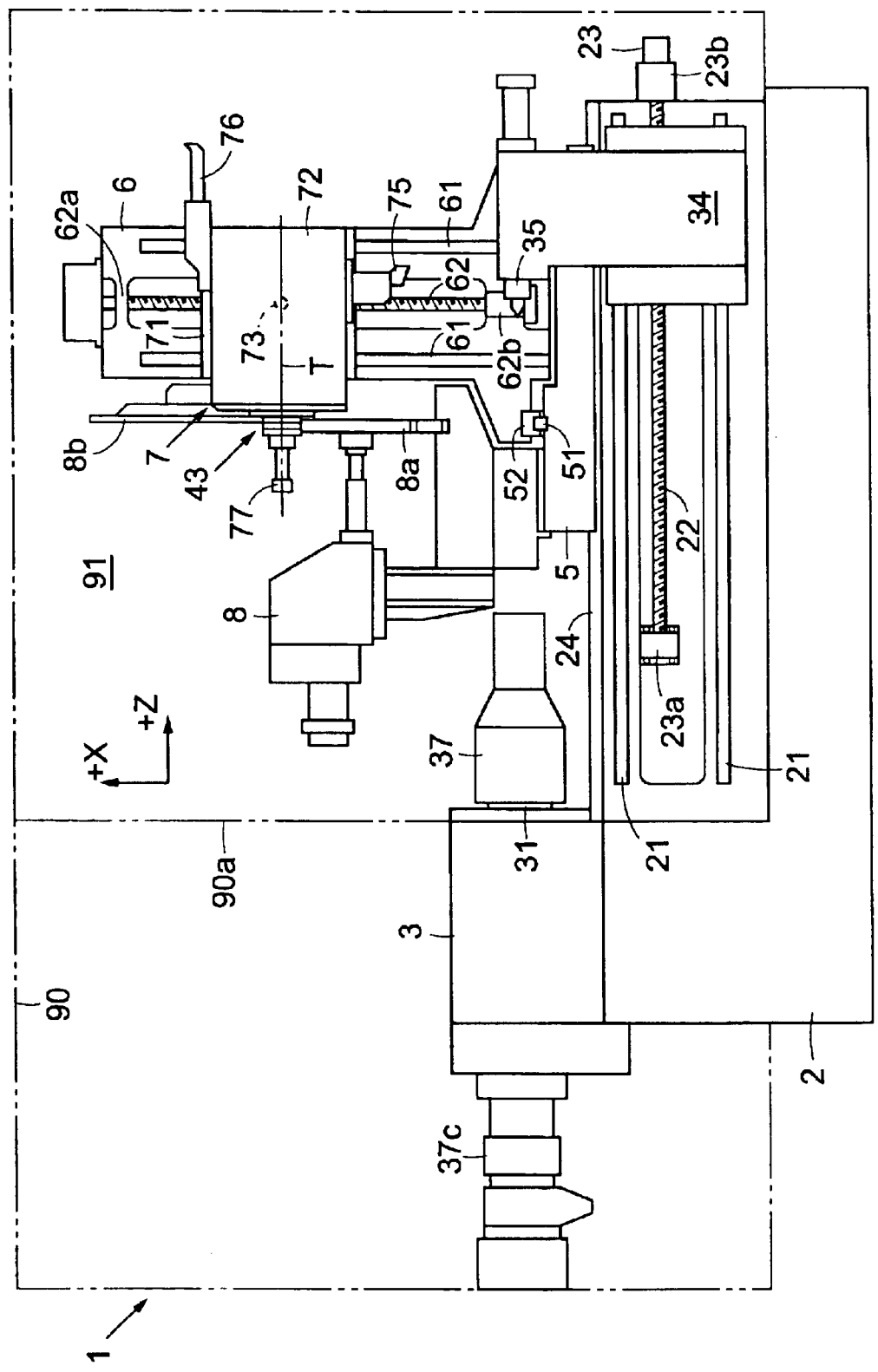
FIG. 1 is a diagram which shows the overall construction of the multi-function machine tool of the present invention.

Embodiments of the present invention will be described with reference to the attached figures. FIG. 1 is a diagram which shows the overall construction of the multi-function machine tool 1 of the present invention. A headstock 3 is fastened to a bed 2 which acts as the base of the multi-function machine tool 1. A main spindle 31 which is used for rotational driving of the workpiece is disposed on the headstock 3. The main spindle 31 is disposed so that the center axial line of this main spindle 31 is oriented in the horizontal direction, and the direction of this center axial line is taken as the direction of the Z axis of an orthogonal coordinate system.

Furthermore, workpiece attachment means 37 which are used to attach the workpiece are fastened to the tip end of the main spindle 31. In a state in which the workpiece is attached to the workpiece attachment means 37, the main spindle 31 is rotationally driven by a built-in main spindle motor (not shown in the figures). Furthermore, the NC device (not shown in the figures) that controls the rotational motion of the main spindle 31 has the function of causing continuous rotation of the main spindle 31 for the purpose of turning, and the function of rotating and positioning the main spindle in the forward and reverse directions along the C axis (i.e., in the direction about the Z axis).

Two tailstock guide rails 21, 21 oriented in the direction of the Z axis are fastened to the forward-facing vertical surface formed on the bed 2. A tailstock 34 is supported on these tailstock guide rails 21, 21 so that this tailstock 34 can move in the direction of the Z axis. A feed screw 22 is supported by bearing parts 23a and 23b between these tailstock guide rails 21, 21 so that this feed screw 22 can rotate. A tailstock moving motor 23 is attached to the bearing part 23b. The output shaft of the tailstock moving motor 23 and the feed screw 22 are connected by a connecting member (not shown in the figures).

Furthermore, a ball nut (not shown in the figures) is fastened to the tailstock 34, and the feed screw 22 and ball nut constitute a ball screw mechanism. The tailstock 34 can be moved and positioned in the direction of the Z axis by the tailstock moving motor 23 and ball screw mechanism. A tailstock spindle 35 which is used to support the workpiece from the opposite side of the main spindle 31 is disposed on the tailstock 34 facing the main spindle 31 so that this tailstock spindle 35 can rotate.

Two Z axis guide rails 24 are fastened in the direction of the Z axis on the horizontal upper surface of the bed 2. A saddle 5 is disposed on these Z axis guide rails 24 so that this saddle 5 can move in the direction of the Z axis. A ball screw mechanism comprising a ball nut and a Z axis feed screw (not shown in the figures) is disposed on the undersurface of the saddle 5. The saddle 5 can be caused to move in the direction of the Z axis by rotationally driving the Z axis feed screw by means of a Z axis feed motor (not shown in the figures).

Furthermore, two Y axis guide rails 51 are respectively fastened in a horizontal attitude to the upper surface of the saddle 5. The direction of the Y axis guide rails 51 is the direction of the Y axis, and is a direction that is perpendicular to the Z axis. Here, furthermore, the Y axis guide rails 51 are disposed in a horizontal attitude. However, the Y axis guide rails need not be horizontal; these guide rails may also be disposed at an inclination. Ball guide main bodies 52 are disposed on the respective Y axis guide rails 51 so that these ball guide main bodies 52 can move. The Y axis guide rails 51 and ball guide main bodies 52 constitute a linear rolling guide.

A column 6 is mounted on the ball guide main bodies 52. This column 6 can move in the direction of the Y axis over the saddle 5. A ball screw mechanism comprising a Y axis feed screw and a ball nut (not shown in the figures) is disposed on the undersurface of the column 6. The column 6 can be caused to move in the direction of the Y axis by rotationally driving the Y axis feed screw by means of a Y axis feed motor (not shown in the figures).

A tool rest 7 is disposed on the front surface side of the column 6. This tool rest 7 is constructed from a tool rest main body 71 and a turning tool rest 72. Two X axis guide rails 61 are fastened to the vertical surface on the front surface side of the column 6 so that these X axis guide rails 61 are oriented in the vertical direction. The direction of the X axis guide rails 61 is the direction of the X axis, and is a direction that is perpendicular to the Y axis and Z axis. Since the two X axis guide rails 61 are disposed in a vertical plane, the discharge of cutting debris during cutting can be accomplished with good efficiency. Ball guide main bodies (not shown in the figures) are disposed on the respective X axis guide rails 61 so that these ball guide main bodies can move. The tool rest main body 71 is mounted on these ball guide main bodies. The tool rest main body 71 can move over the front surface of the column 6 in the direction of the X axis, i.e., in the vertical direction. Furthermore, the turning tool rest 72 is disposed on the tool rest main body 71 so that this turning tool rest 72 can turn.

A ball nut (not shown in the figures) is fastened to the rear surface side of the tool rest main body 71. An X axis feed screw 62 is engaged with this ball nut, and the ball nut and X axis feed screw 62 constitute a ball screw mechanism. The X axis feed screw 62 is supported by bearing parts 62a and 62b so that this X axis feed screws 62 can rotate, and the bearing parts 62a and 62b are disposed on the column 6. The X axis feed screw 62 and the output shaft of an X axis feed motor (not shown in the figures) are connected by a toothed pulley—toothed belt mechanism, so that the X axis feed screw 62 can be rotationally driven by the X axis feed motor.

The tool rest main body 71 and turning tool rest 72 can be moved in the direction of the X axis by driving the X axis feed motor so that the X axis feed screw is caused to rotate. Furthermore, for example, control motors such as servo motors are used as the X axis feed motor, Y axis feed motor, Z axis feed motor and tailstock moving motor in the above-mentioned X, Y and Z axis moving mechanisms. Moreover, these respective motors are controlled by an NC device. Furthermore, arbitrarily selected guide mechanisms such as linear rolling guides, sliding guides or the like are used as the guide parts for the respective axes.

The turning tool rest 72 is disposed so that this turning tool rest 72 can turn with respect to the tool rest main body 71 about a turning axis 73 that is disposed in a direction parallel to the Y axis. The turning motion of this turning tool rest 72 is controlled as a B axis motion by the NC device. The B axis driving mechanism transmits the driving force of a B axis feed motor (not shown in the figures) to the turning tool rest 72 via a transmission mechanism such as a roller gear cam mechanism, worm—worm wheel mechanism or the like, so that the turning tool rest 72 is caused to perform a rotating action about the turning axis 73. For example, a control motor such as a servo motor is used as the B axis feed motor. This B axis movement allows movement and positioning in an arbitrary angular position in a range of 180 degrees about the turning axis 73. Specifically, the tool attached to the turning tool rest 72 can be turned and positioned in an arbitrary direction.

Furthermore, a tool main spindle 40 (see FIG. 2) which has a center axial line T is disposed on the turning tool rest 72 so that this tool main spindle 40 can rotate. A tool mounting part 43 is disposed on the tip end portion of the tool main spindle 40, and various types of tools such as a plate-form bite 77 or the like can be automatically attached to or detached from this tool mounting part 43 by the changing arm 8*a* of an automatic tool changer 8. Specifically, tools can be automatically replaced. The tools that are replaced and used are accommodated in a tool magazine 8*b*. The tool main spindle 40 is rotationally driven by a built-in motor (not shown in the figures) contained in the turning tool rest 72.

Bites 75, 76 used for turning are attached to the side surface of the turning tool rest 72 via tool attachment members. The bites 75 and 76 cannot be automatically replaced by the automatic tool changer 8; instead, however, the supporting rigidity is large, so that flexing, vibration and the like can be reduced, thus making it possible to perform high-precision turning. It is desirable that these bites 75 and 76 be provided in order to perform high-precision turning; however, the bites may also be omitted.

Splash guards 90 and 90*a* are attached to the bed 2. The splash guards 90 and 9*a* are disposed so that these splash guards cover the machining region 91, thus preventing splashing matter such cutting oil, cutting debris generated in the working region 91 and the like from splashing to the outside of the machining region 91.

Figure 2:
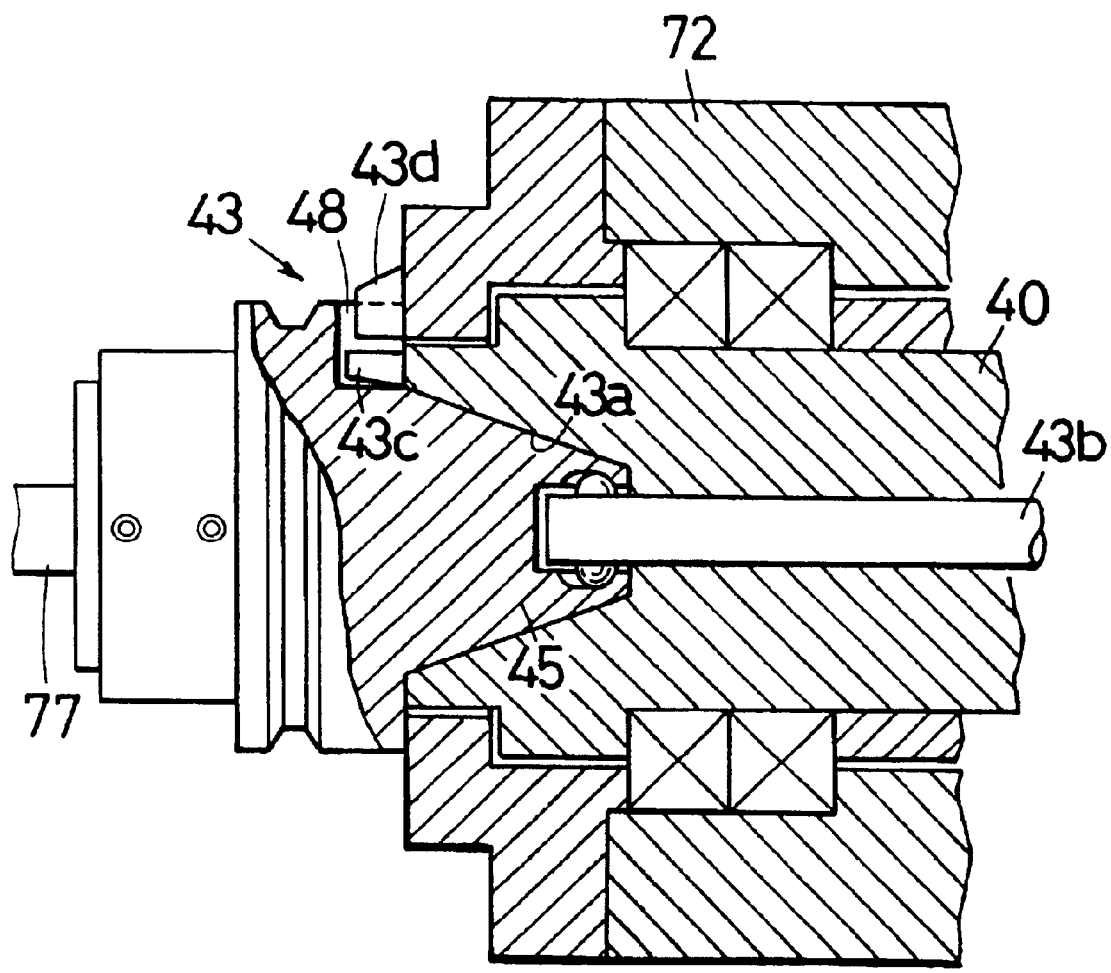
FIG. 2 is an enlarged sectional view showing a state in which a non-rotating tool is mounted in the tool mounting part of the tool main spindle.
Figure 3:
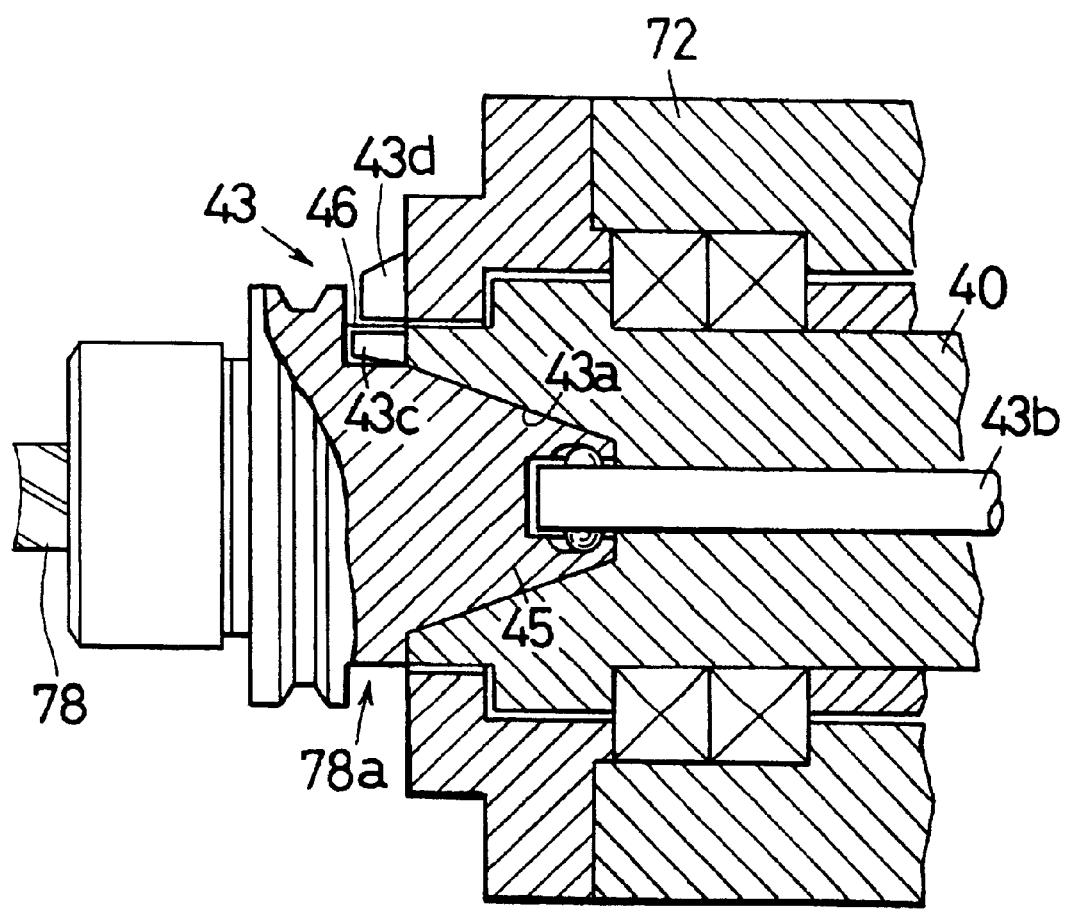
FIG. 3 is an enlarged sectional view showing a state in which a rotating tool is mounted in the tool mounting part of the tool main spindle.

FIGS. 2 and 3 are enlarged sectional views which shows the construction of the tool main spindle 40 and tool mounting part 43. FIG. 2 shows a state in which a non-rotating tool such as a plate-form bite 77 or the like is mounted on the tool mounting part 43. The shank part 45 of the tool shank of the plate-form bite 77 is inserted into the mounting opening 43*a* of the tool mounting part 43, and the rear end portion of the shank part 45 is drawn into the mounting opening 43*a* by a draw bar 43*b*. Furthermore, the shank part 45 is tightly fastened to the mounting opening 43*a* by the pulling force of the draw bar 43*b*.

Furthermore, an anchoring recess 48 is formed in the flange part of the tool shank of the plate-form bite 77, and an engaging key 43*c* is formed on the tip end surface of the tool main spindle 40. Moreover, a rotation-checking key 43*d* for non-rotating tools is formed on the side of the turning tool rest 72 that is in close proximity to the engaging key 43*c*. Before the tool shank of the plate-form bite 77 is mounted in the tool mounting part 43, the angular position about the axis of the tool main spindle 40 is positioned so that the engaging key 43*c* and rotation-checking key 43*d* are in the same phase. When the plate-form bite 77 is mounted in the tool mounting part 43, the rotation-checking key 43*d* used as rotation regulating means fits into the anchoring recess 48, so that rotation about the axis of the plate-form bite 77 is checked. In this case, the engaging key 43*c* also fits into the anchoring recess 48.

FIG. 3 shows a state in which a rotating tool such as an end mill 78 or the like is mounted in the tool mounting part 43. The shank part 45 of the tool shank of the end mill 78 is inserted into the mounting opening 43*a* of the tool mounting part 43, and the rear end portion of the shank part 45 is drawn into the mounting opening 43*a* by the draw bar 43*b*. Furthermore, the shank part 45 is tightly fastened to the mounting opening 43*a* by the pulling force of the draw bar 43*b*.

The portion 78*a* of the flange part of the end mill 78 on the side of the shank part is formed in a shape that does not engage with the rotation-checking key 43*d*. Furthermore, this portion 78*a* is provided with an engaging recess 46. When the tool shank of the end mill 78 is mounted in the tool mounting part 43, the engaging key 43*c* enters the engaging recess 46, so that the relative positions of the tool shank of the end mill 78 and the tool main spindle 40 about the axis of rotation are fixed. Specifically, the tool shank of the end mill 78 rotates as a unit with the tool main spindle 40. Accordingly, the end mill 78 is not engaged with the rotation-checking key 43*d*, and can be rotationally driven by the tool main spindle 40.

Furthermore, in FIGS. 2 and 3, the engaging key 43*c*, rotation-checking key 43*d*, engaging recess 46 and anchoring recess 48 are shown in only one place each. However, two of each of these parts may be disposed in facing positions separated by 180 degrees on the circumference, or three or more of each of these parts may be disposed. Furthermore, the rotation regulating means may also be means which prevent rotation of the main tool spindle 40 and plate-form bite 77 about the axis of rotation by disposing a positioning member that can be engaged with and disengaged from the tool main spindle 40 on the side of the turning tool rest 72, and causing this positioning member to engage with an engaged part of the tool main spindle 40, means which prevent the rotation of the tool main spindle 40 and plate-form bite 77 about the axis of rotation by disposing a pair of couplings that can be engaged and disengaged between the turning tool rest 72 and tool main spindle 40, and engaging these couplings, or the like.

Here, furthermore, the shank part 45 is tightly fastened to the mounting opening 43*a* by causing the ball of the draw bar 43*b* to engage with an inner circumferential groove in the tool shank; however, it would also be possible to use a construction in which a pull stud is fastened to the tool shank, and tight fastening is accomplished by pulling this pull stud by means of a collet type pulling mechanism or ball type pulling mechanism.

Figure 15:
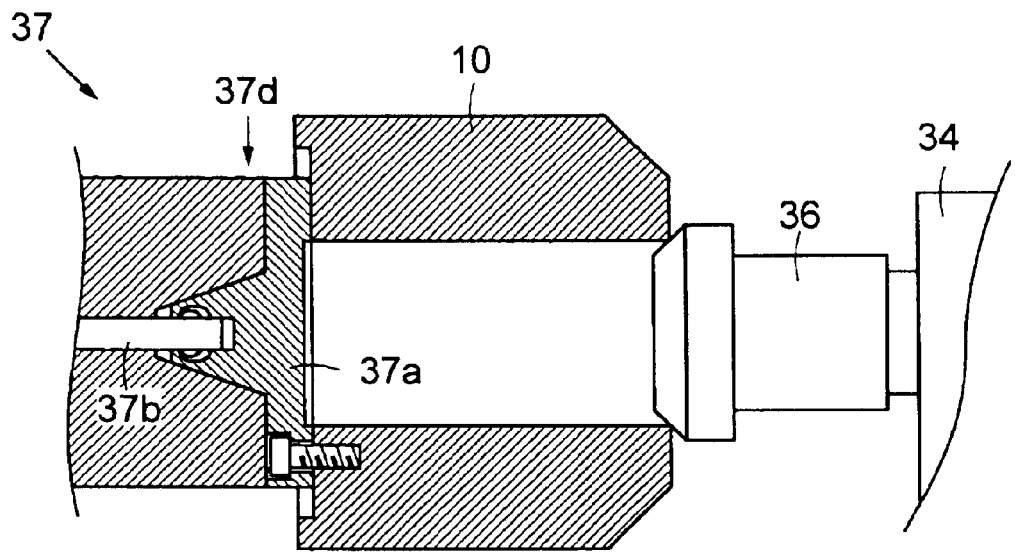
FIG. 15 is an enlarged sectional view showing a state in which the workpiece is attached to the workpiece attachment means.

Next, the construction of the workpiece attachment means 37 will be described with reference to FIG. 15. FIG. 15 is an enlarged sectional view showing a state in which a workpiece 10 is attached to the workpiece attachment means 37. A draw bar 37*b* is disposed inside the main spindle 31 and the workpiece attachment means 37 so that this draw bar can advance and retract. Furthermore, a chuck cylinder 37c (see FIG. 1) is disposed on the rear part of the main spindle 31. The draw bar 37b moves as a result of being driven by the chuck cylinder 37c. Furthermore, the draw bar 37b may also be a draw bar which is constantly driven toward the rear of the main spindle 31 by a spring member so that the draw bar 37b is placed in clamped state, and which is pushed by the chuck cylinder 37c only when the draw bar is placed in an unclamped state.

A workpiece mounting part 37d which has a tapered hole part is disposed on the front end of the workpiece attachment means 37. The workpiece 10 is fastened to an attachment member 37a by bolts. A tapered shaft part is formed on the attachment member 37a. The tapered shaft part of the attachment member 37a is inserted into the tapered hole part of the workpiece mounting part 37d, and the attachment member 37a is pulled into the workpiece mounting part 37d by the draw bar 37b. Furthermore, the attachment member 37a is tightly fastened to the workpiece mounting part 37d by the pulling force of the draw bar 37b.

Figure 16:
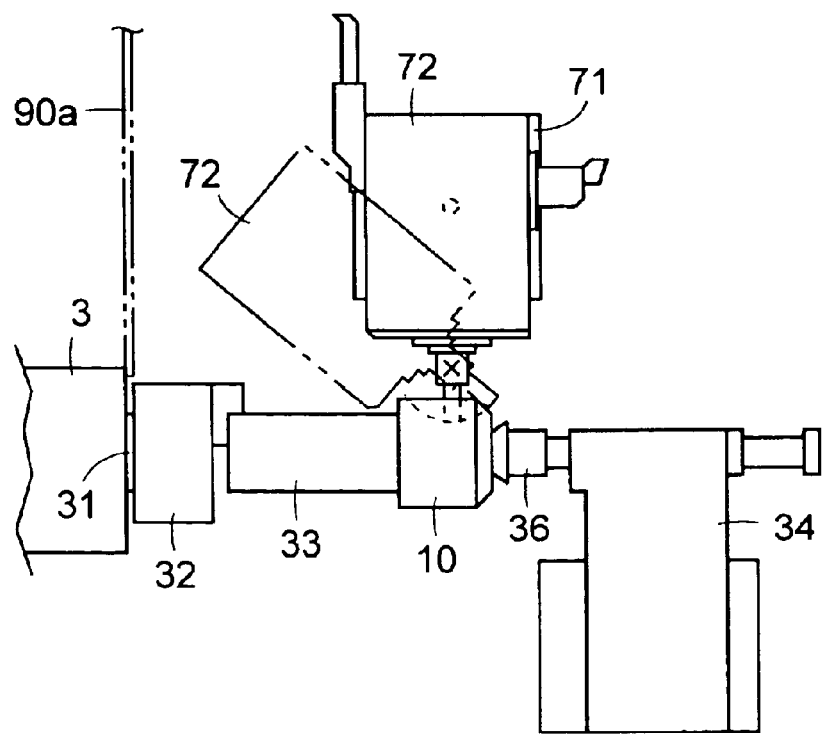
FIG. 16 is a diagram which shows the construction of another configuration of the workpiece attachment means.

FIG. 16 is a diagram which shows another configuration of the workpiece attachment means. In this configuration, a chuck 32 is disposed on the tip end of the main spindle 31. The workpiece 10 is fastened to the tip end of an attachment member 33 (attachment jig), and the rear end of this attachment member 33 is gripped by the gripping jaws of the chuck 32. Here, the chuck 32 and attachment member 33 constitute workpiece attachment means.

Thus, it is sufficient if the workpiece attachment means are means that are capable of attaching the workpiece on the front side on the axial line of the main spindle 31 in a position that is separated from the main spindle 31 by a specified distance. As a result of the workpiece attachment means being constructed in this manner, there is no interference between the turning tool rest 72 and the splash guard 90a or bed 2 even in cases where the turning tool rest 72 is turned as shown in the figures.

Figure 4:
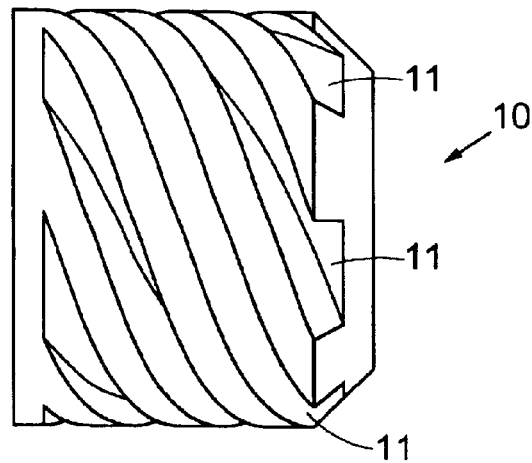
FIG. 4 is a diagram which shows one example of the shape of the helical groove that is machined by the multi-function machine tool.

FIG. 4 is a diagram which shows one example of the shape of the helical grooves that are machined by the multi-function machine tool 10f the present invention. A plurality of helical grooves 11 with a specified groove width and cross-sectional shape are formed in the outer circumferential surface of a substantially cylindrical workpiece 10. The depths of these helical grooves 11 vary with respect to the axial direction of the workpiece 10. The machining of such helical grooves is necessary in the manufacture of pump rotors, roller cam shafts and the like. For example, the shapes of helical grooves used in pumps must be set in accordance with the pump specifications, i.e., the dimensions and dispositions of respective members of the pump and the like, so that there are numerous variations.

Figure 5:
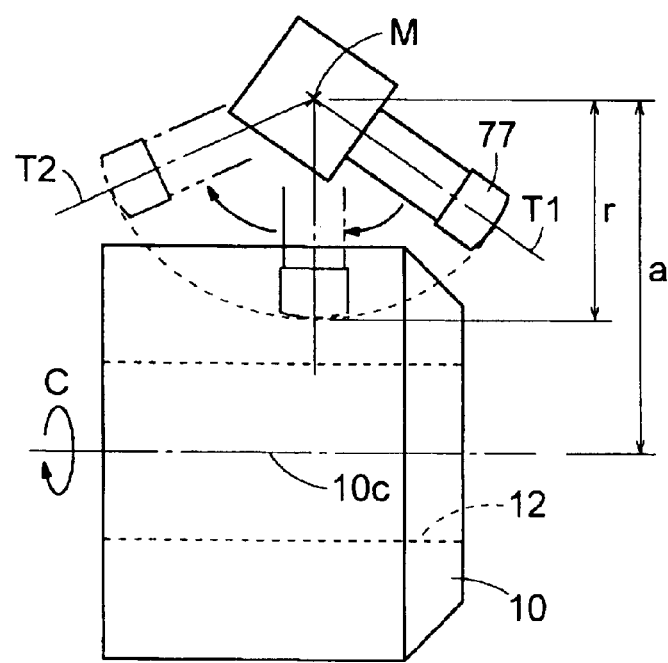
FIG. 5 is a diagram which shows the helical groove machining method.

FIG. 5 is a diagram which illustrates a method used to machine helical grooves 11 in the workpiece 10. The workpiece 10 has a center hole 12 or the like that is oriented along the center axial line 10c, and the overall shape of the workpiece 10 is substantially cylindrical. While the workpiece 10 is caused to rotate at a specified constant speed about the center axial line 10c, the machining of the abovementioned helical grooves is performed concurrently and synchronously with this rotation by a tool such as a plate-form bite 77 or the like. The motion of the plate-form bite 77 is a turning motion at a constant speed about the turning center M of the tool. As is shown in the figures, the plate-form bite 77 is turned about the turning center M of the tool until the center axial line of the tool reaches the angular position indicated by the symbol T2 from the angular position indicated by the symbol T1.

The turning motion of the tool is determined by the position of the turning center M of the tool and the distance from the turning center M to the cutting edge of the tool, i.e., the rotating radius r of the cutting edge of the tool. The position of the turning center M of the tool is expressed by the distance a between the center axial line 10c of the workpiece 10 and the turning center M. The shape of the helical groove machined by the method shown in FIG. 5 is determined by the rotational motion of the workpiece 10 about the center axial line 10c (C axis rotational motion), the turning motion of the tool and the shape of the tool. Accordingly, if the position of the turning center M of the tool can be set in an arbitrary position, helical grooves of various shapes can be machined.

Figure 6:
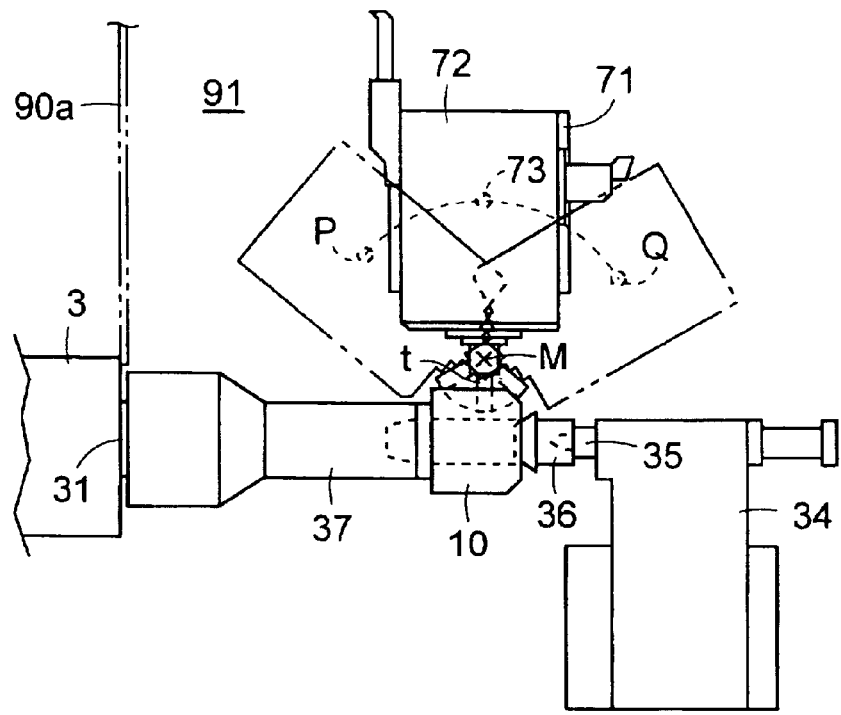
FIG. 6 is a diagram which shows the conditions of machining of the helical groove by the multi-function machine tool.

FIG. 6 is a diagram which shows the conditions of machining of helical grooves by the multi-function machine tool 1. The manner in which the turning motion of the tool about the turning center M is realized will be described with reference to FIG. 6. Since the turning tool rest 72 can turn about the turning axis 73 with respect to the tool rest main body 71, the direction of the center axial line T of the tool can be oriented in an arbitrary direction. Furthermore, since the tool rest main body 71 can move in the directions of the X and Z axes with respect to the workpiece 10, the movement of the tool rest main body 71 can be controlled so that the turning center M is always located in a fixed position.

As is seen from the figures, it is necessary to cause the tool rest main body 71 and turning axis 73 to perform a circular-arc motion about the rotational center 73 in order to cause the turning tool rest 72 to perform a turning motion about the turning center M. In other words, the turning tool rest 72 and tool can be caused to perform a turning motion about the turning center M by concurrently and synchronously causing a turning motion (B-axis rotational motion) of the turning tool rest 72 about the turning axis 73, and a circular-arc motion of the tool rest main body 71 along the X and Z axes.

If the X and Z axis coordinates of the starting point P and end point Q of the circular-arc track along which the center of the turning axis 73 passes are designated as P(xp, zp) and Q(xq, zq), then the coordinate values of the starting point P can be calculated from the B axis turning angle at the starting point P, and the coordinate values of the end point Q can be calculated from the B axis turning angle at the end point Q. The concrete calculation method will be described later. The machining of a helical groove of a specified shape in the workpiece 10 can be accomplished by concurrently and synchronously causing a turning motion of the tool about the turning center M and a C axis rotational motion of the workpiece 10.

When machining is actually performed, the workpiece 10 is fastened to the workpiece attachment means 37. The workpiece attachment means 37 are fastened to the front part of the main spindle 31. Furthermore, a splash guard 90a (partitioning cover) is provided in order to prevent cutting debris, coolant and the like from splashing onto the side of the headstock 3 from the machining region 91. The reason that workpiece attachment means 37 that extend forward in the axial direction of the main spindle 31 are used is to prevent interference between the turning tool rest 72 and the splash guard 90a or the like. Furthermore, the end portion of the workpiece 10 on the opposite end from the workpiece attachment means 37 is supported by a supporting part 36 which is fastened to the tailstock spindle 35 of the tailstock 34. The supporting part 36 is formed in a shape which makes it possible to support the workpiece 10 by engaging with the central hole 12 of the workpiece 10.

First, an end mill which is a rotating tool is mounted as the tool t, and the rough machining of a helical groove is performed by synchronously causing the C axis rotational motion of the workpiece 10 and the turning motion of the tool t about the turning center M. Next, the tool t is automatically changed to a plate-form bite, and the finishing machining of the helical groove is performed by synchronously causing the C axis rotational motion of the workpiece 10 and the turning motion of the tool t about the turning center M. The finishing machining performed by the plate-form bite will be described in detail later.

Figure 7:
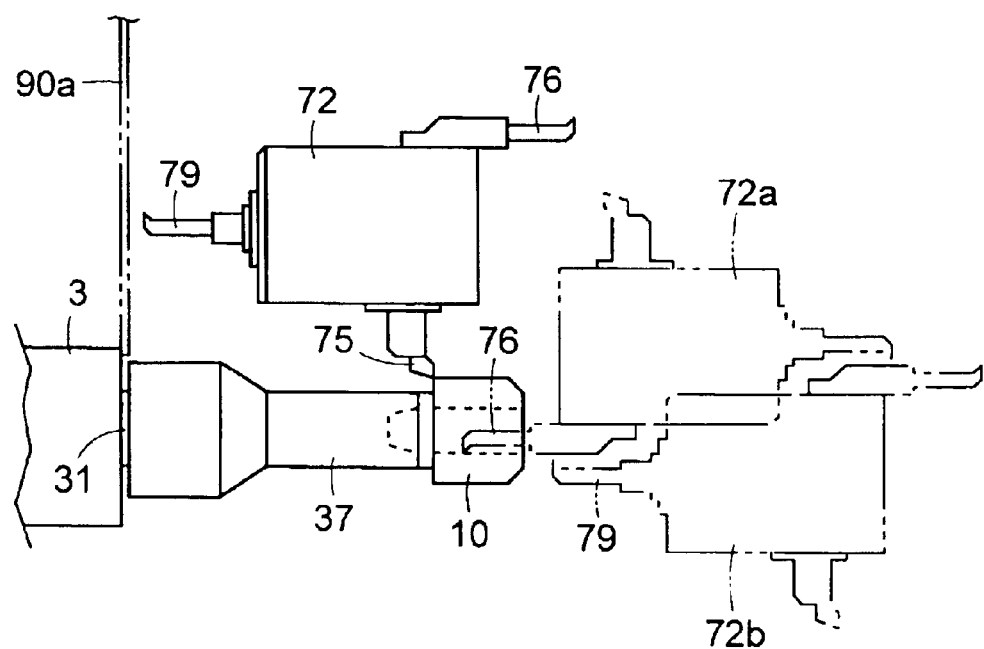
FIG. 7 is a diagram which shows the conditions of machining of portions of the workpiece other than the helical groove.

FIG. 7 is a diagram which shows the conditions of machining on the workpiece 10 in areas other than the helical groove. It is desirable that the machining of areas other than the helical groove be performed prior to the machining of the helical groove by the plate-form bite. The tool shank or the like of a bite 79 used for machining of the inside diameter is automatically replaced and mounted in the tool mounting part 43 of the turning tool rest 72 by the automatic tool changer 8. Then, the turning tool rest 72 is moved to the position indicated by the symbol 72b in FIG. 7 or the like, and rough turning or the like of the end portion of the central hole 12 of the workpiece 10 is performed by the bite 79 used for machining of the inside diameter that is mounted in the tool mounting part 43 of the turning tool rest 72. Furthermore, the tool shank of a bite used for machining of the outside diameter may be mounted in the tool mounting part 43, and the turning tool rest 72 may be placed in a state in which this tool rest is turned 90 degrees, so that rough turning of the outer circumferential portion of the workpiece 10 is performed.

Next, the turning tool rest 72 is moved into the position indicated by the symbol 72a, and finishing turning of the end surface or the like of the central hole 12 of the workpiece 10 is performed by a bite 76 fastened to one side surface of the turning tool rest 72. In this case, furthermore, the tailstock 34 is caused to wait in a waiting position. Furthermore, the turning tool rest 72 is moved into the position indicated by a solid line in FIG. 7, and finishing turning of the outer circumferential portion or the like of the workpiece 10 is performed by a bite 75 fastened to the other side surface of the turning tool rest 72.

Furthermore, the finishing turning of the end portion of the workpiece 10, the finishing turning of the central hole 12 and the like may also be performed following the rough machining of the helical groove or following the finishing machining of the helical groove. Alternatively, the turning may be performed as machining in which only portions of the machining of the outer circumferential surface, end surfaces and inner circumferential surface are performed.

As was described above, the multi-function machine tool 1 of the present invention makes it possible to perform the machining of helical grooves of various shapes. Furthermore, not only the machining of helical grooves in the workpiece 10, but also the machining of other portions of the workpiece 10 before and after the machining of the helical grooves can be continuously performed. As a result, the machining efficiency of the workpiece can be greatly improved. This is an advantage that cannot be realized in the case of the machining of helical grooves by means of a special machine.

Figure 8:
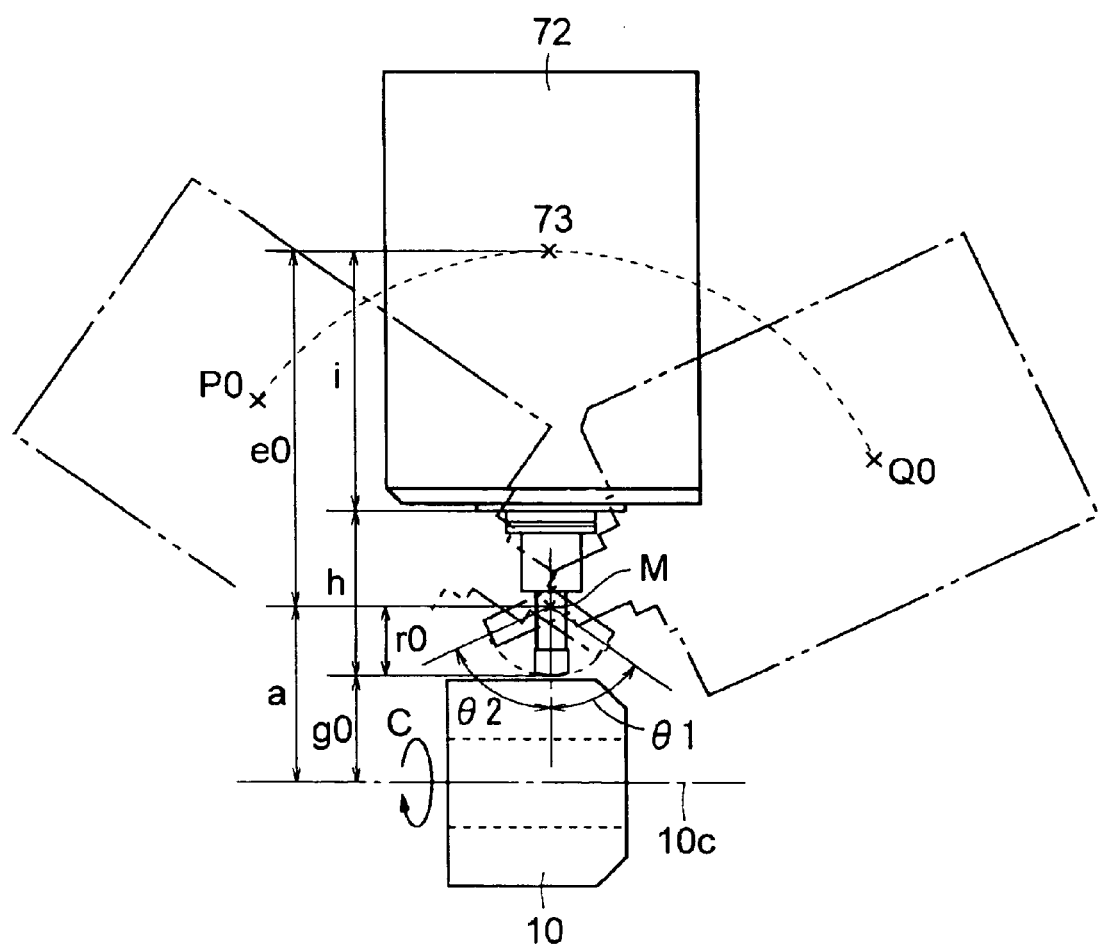
FIG. 8 is a diagram which shows the procedure of the finishing machining of the helical groove.
Figure 9:
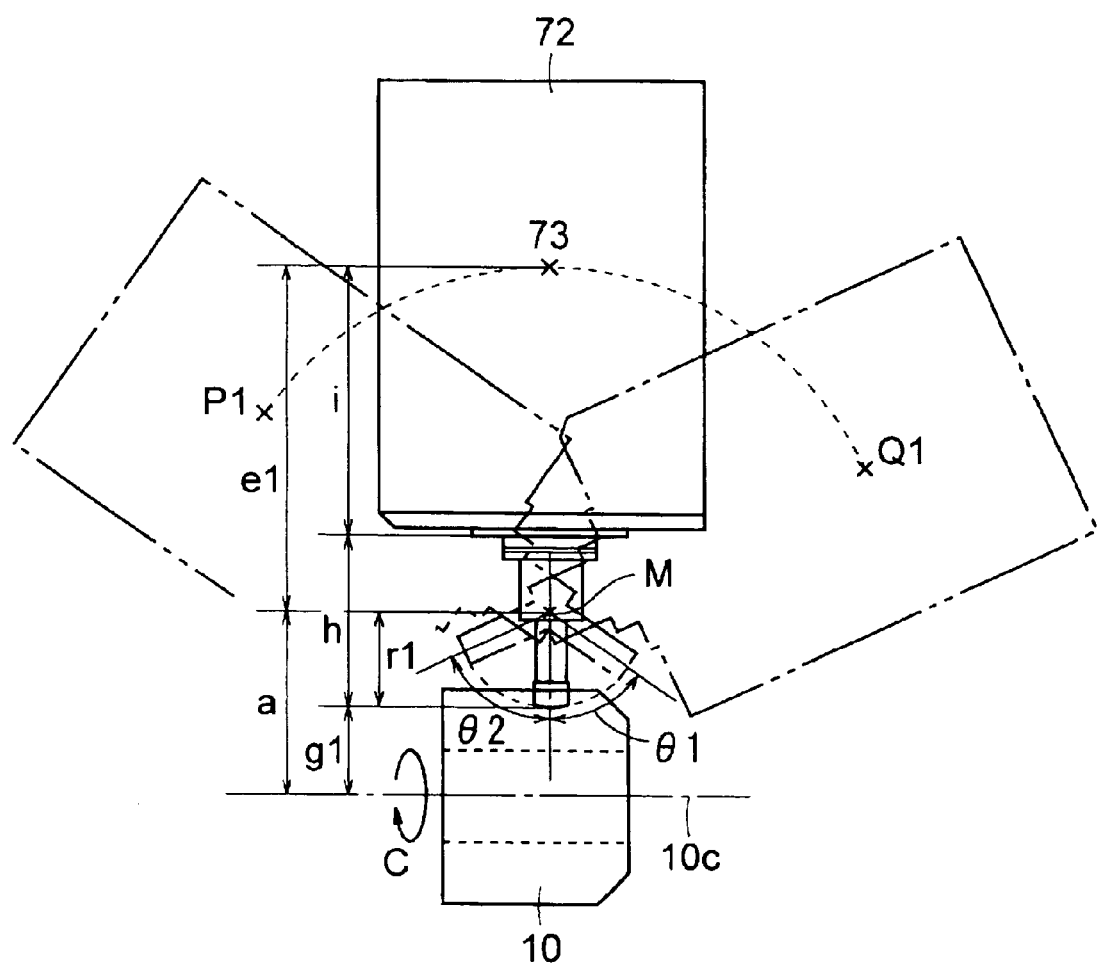
FIG. 9 is a diagram which shows the procedure of the finishing machining of the helical groove.
Figure 10:
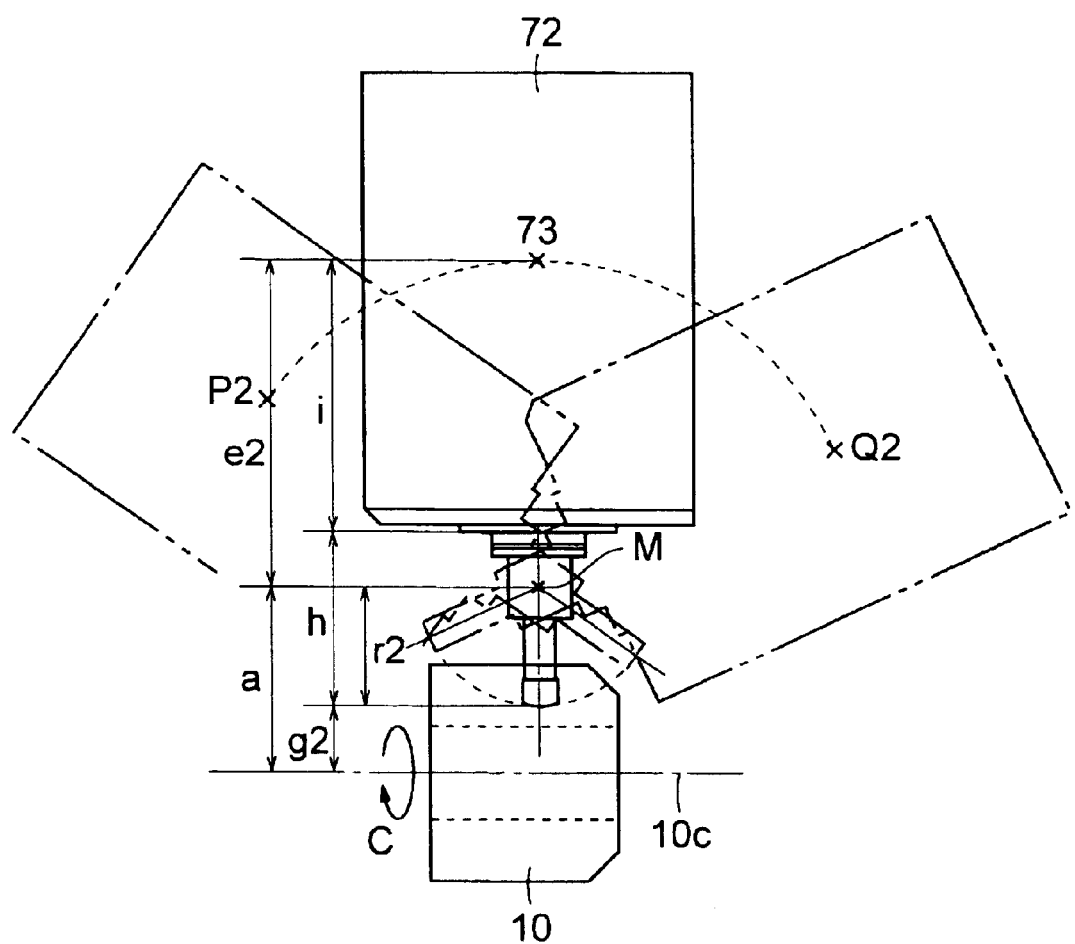
FIG. 10 is a diagram which shows the procedure of the finishing machining of the helical groove.

FIGS. 8 through 10 are diagrams which show the detailed procedure of the finishing machining of the helical groove by the plate-form bite 77. Here, the rough machining of the helical groove has already been performed on the workpiece 10 by the abovementioned end mill. Finishing machining is performed on this roughly machined helical groove by increasing the cutting depth of the plate-form bite 77 constituting the tool in stages. FIG. 8 shows a state in which the tip end portion of the tool does not cut into the workpiece 10. The distance a from the central axis of the workpiece 10 to the turning center M of the tool is set as a parameter for designating the shape of the helical groove.

The distance from the center of the turning axis 73 of the turning tool rest 72 to the mounting reference plane of the tool mounting part 43 is indicated by the symbol i. The distance i is a value that is peculiar to the multi-function machine tool 1, and does not vary during machining. The value of the distance i is stored in a specified region of the memory in the NC device that controls the multi-function machine tool 1. The distance from the mounting reference plane of the tool mounting part 43 to the tip end of the cutting edge of the tool is indicated by the symbol h. The distance h is a value that is peculiar to the tool. When tool replacement is performed, the value of the distance h for the current tool is set in a specified region of the memory in the NC device.

The distance g0 is the distance between the tip end of the cutting edge of the tool and the center axial line 10c of the workpiece 10 when the tip end of the cutting edge of the tool is closest to the center axial line 10c of the workpiece 10. The distance g0 is selected so that this distance is greater than the radius of the workpiece 10 by a specified amount. The distance r0 is the distance between the tip end of the cutting edge of the tool and the turning center M, and is the radius of the circular arc described by the tip end of the cutting edge of the tool. The distance a is the distance between the center axial line 10c of the workpiece 10 and the turning center M of the tool, and is a dimension that is designated in the machining drawings for the product.

The distance a, distance g0 and distance r0 have the relationship a r0+g0. As a result, one of the distances g0 and r0 can be determined from the other. The distance e0 is the distance between the center of the turning axis 73 and the turning center M, and is the radius of the circular arc described by the center of the turning axis 73. From FIG. 8, the distance e0 is determined using the following equation.

$$e0 = i + h - r0$$

Here, since a=r0+g0, the above equation can also be written as the following equation. Specifically, the distance e0 can be determined from the distance g0.

$$e0 = i + h + g0 - a$$

The (X coordinate, Z coordinate) of the turning center M of the tool are designated as (a, zm). Furthermore, in NC machining programs for lathes and turning centers, the center axial line 10c of the workpiece 10 is ordinarily the 0 position of the X coordinate axis, and the directions in which the tool rest 7 is separated from the main spindle 31 are respectively designated as the +X direction and +Z direction (see FIG. 1). Accordingly, the following description will be based on this coordinate system.

The turning axis 73 of the turning tool rest 72 is controlled so as to perform a circular-arc motion from the starting point indicated by the position P0 to the end point indicated by the position Q0. The angle formed by the central axis of the tool and a perpendicular line (straight line perpendicular to the center axial line 10c) at the starting point P0 is designated as θ1, and the angle formed by the central axis of the tool and this perpendicular line at the end point Q0 is designated as θ2. The (X coordinate, Z coordinate) of the starting point P0 are designated as (xp0, zp0), and the (X coordinate, Z coordinate) of the end point Q0 are designated as (xq0, zq0). The respective coordinate values of the starting point P0 and end point Q0 are determined using the following equations.

$$xp0 = a + e0 \cdot \cos(\theta 1)$$

$$zp0 = zm - e0 \cdot \sin(\theta 1)$$

$$xq0 = a + e0 \cdot \cos(\theta 2)$$

$$zq0 = zm + e0 \cdot \sin(\theta 2)$$

Accordingly, it is sufficient if the system is controlled so that the center of the turning axis 73 describes a circular arc (a clockwise circular arc in this case) which passes through the starting point P0 and end point Q0 determined by the above equations, and whose radius is the distance e0. Furthermore, in the NC machining program of a lathe or turning center, the X coordinate is ordinarily indicated as a diameter; here, however, the value of the X coordinate is indicated as the value of the distance itself in order to simplify the description. The value of the X axis here needs to be doubled in order to get the value that indicates a diameter.

The X axis and Z axis are controlled so that the center of the turning axis 73 of the tool rest main body 71 moves over a circular-arc track which passes through the starting point P0 and end point Q0, and which has a radius of e0. Furthermore, in synchronization with this, the turning tool rest 72 is caused to perform a B axis turning motion about the turning axis 73 from the rotational angle corresponding to the angle θ1 to the rotational angle corresponding to the angle θ2. Moreover, the cutting edge of the tool is caused to perform a motion along the helical groove of the workpiece 10 by causing the workpiece 10 to perform a C axis rotational motion about the center axial line 10c concurrently and synchronously with the abovementioned motions.

Next, in FIG. 9, in order to cause the tool to cut into the helical groove, the distance g1 between the tip end of the cutting edge of the tool and center axial line 10c of the workpiece 10 in the closest state is reduced to a value that is smaller than the distance g0 in FIG. 8. Specifically, the distance g1 is selected so that this distance is smaller than the radius of the workpiece 10. In this case, the radius r1 of the circular arc described by the tip end of the cutting edge of the tool is larger than the radius r0 in FIG. 8, and the radius e1 of the circular arc described by the center of the turning axis 73 is smaller than the radius e0 in FIG. 8. From FIG. 9, the distance e1 is determined using the following equation.

$$e1 = i + h - r1$$

The turning axis 73 of the turning tool rest 72 is controlled so that this axis performs a circular-arc motion from the starting point indicated by the position P1 to the end point indicated by the position Q1. The B axis turning motion of the turning tool rest 72 about the turning axis 73 has the same starting angle and ending angle as in the case of FIG. 8. The (X coordinate, Z coordinate) of the starting point P1 are designated as (xp1, zp1), and the (x coordinate, Z coordinate) of the end point Q1 are designated as (xq1, zq1). The respective coordinate values of the starting point P1 and end point Q1 are determined using the following equations.

$$xp1 = a + e1 \cdot \cos(\theta 1)$$

$$zp1 = zm - e1 \cdot \sin(\theta 1)$$

$$xq1 = a + e1 \cdot \cos(\theta 2)$$

$$zq1 = zm + e1 \cdot \sin(\theta 2)$$

Thus, the circular-arc track that is to be described by the center of the turning axis 73 of the tool rest main body 71 is determined from the radius r1 of the circular arc described by the tip end of the cutting edge of the tool (or the distance g1). The X axis and Z axis are controlled so that the center of the turning axis 73 of the tool rest main body 71 is caused to move along a circular-arc track with a radius of e1 that passes through the starting point P1 and end point Q1; furthermore, in synchronization with this motion, the turning tool rest 72 is caused to perform a B axis turning motion about the turning axis 73 from the rotational angle corresponding to the angle θ1 to the rotational angle corresponding to the angle θ2. Moreover, the cutting edge of the tool is caused to move along the helical groove of the workpiece 10 by causing the workpiece 10 to perform a C axis rotational motion about the center axial line 10c concurrently and synchronously with the abovementioned motions, so that finishing machining of the helical groove is performed.

Next, in FIG. 10, in order to cause the tool to cut further into the helical groove, the distance g2 between the tip end of the cutting edge of the tool and the center axial line 10c of the workpiece 10 in the closest state is reduced to a value that is smaller than the distance g1 in FIG. 9. In this case, the radius r2 of the circular arc described by the tip end of the cutting edge of the tool is larger than the radius r1 in FIG. 9, and the radius e2 of the circular arc described by the center of the turning axis 73 is smaller than the radius e1 in FIG. 9. From FIG. 10, the distance e2 is determined using the following equation.

$$e2 = i + h - r2$$

The system is controlled so that the turning axis 73 of the turning tool rest 72 performs a circular-arc motion from the starting point indicated by the position P2 to the end point indicated by the position Q2. The B axis turning motion of the turning tool rest 72 about the turning axis 73 has the same starting angle and ending angle as in the cases shown in FIGS. 8 and 9. The (X coordinate, Z coordinate) of the starting point P2 are designated as (xp2, zp2), and the (X coordinate, Z coordinate) of the end point Q2 are designated as (xq2, zq2). The respective coordinate values of the starting point P2 and end point Q2 are determined using the following equations.

$$xp2 = a + e2 \cdot \cos(\theta 1)$$

$$zp2 = zm - e2 \cdot \sin(\theta 1)$$

$$xq2 = a + e2 \cdot \cos(\theta 2)$$

$$zq2 = zm + e2 \cdot \sin(\theta 2)$$

Thus, the circular-arc track that is to be described by the center of the turning axis 73 of the tool rest main body 71 is determined from the radius r2 of the circular arc described by the tip end of the cutting edge of the tool (or the distance g2). The X axis and Z axis are controlled so that the center of the turning axis 73 of the tool rest main body 71 is caused to move along a circular-arc track with a radius of e2 that passes through the starting point P2 and end point Q2. In synchronization with this motion, the turning tool rest 72 is caused to perform a B axis turning motion about the turning axis 73 from the rotational angle corresponding to the angle θ1 to the rotational angle corresponding to the angle θ2. Furthermore, the cutting edge of the tool is caused to move along the helical groove of the workpiece 10 by causing the workpiece 10 to perform a C axis rotational motion about the center axial line 10c concurrently and synchronously with the abovementioned motions, so that finishing machining of the helical groove is performed.

Thus, as is shown in FIGS. 8 through 10, the finishing machining of the helical groove is completed by repeating machining a plurality of times with the amount by which the tool cuts into the helical groove being increased in stages. As was indicated in the above description, the circular-arc track that is described by the center of the turning axis 73 of the tool rest main body 71 at each amount of cutting is determined from the radius of the circular arc described by the tip end of the cutting edge of the tool, or the distance between the tip end of the cutting edge of the tool and the center axial line 10c of the workpiece 10 in the closest state.

Figure 11:
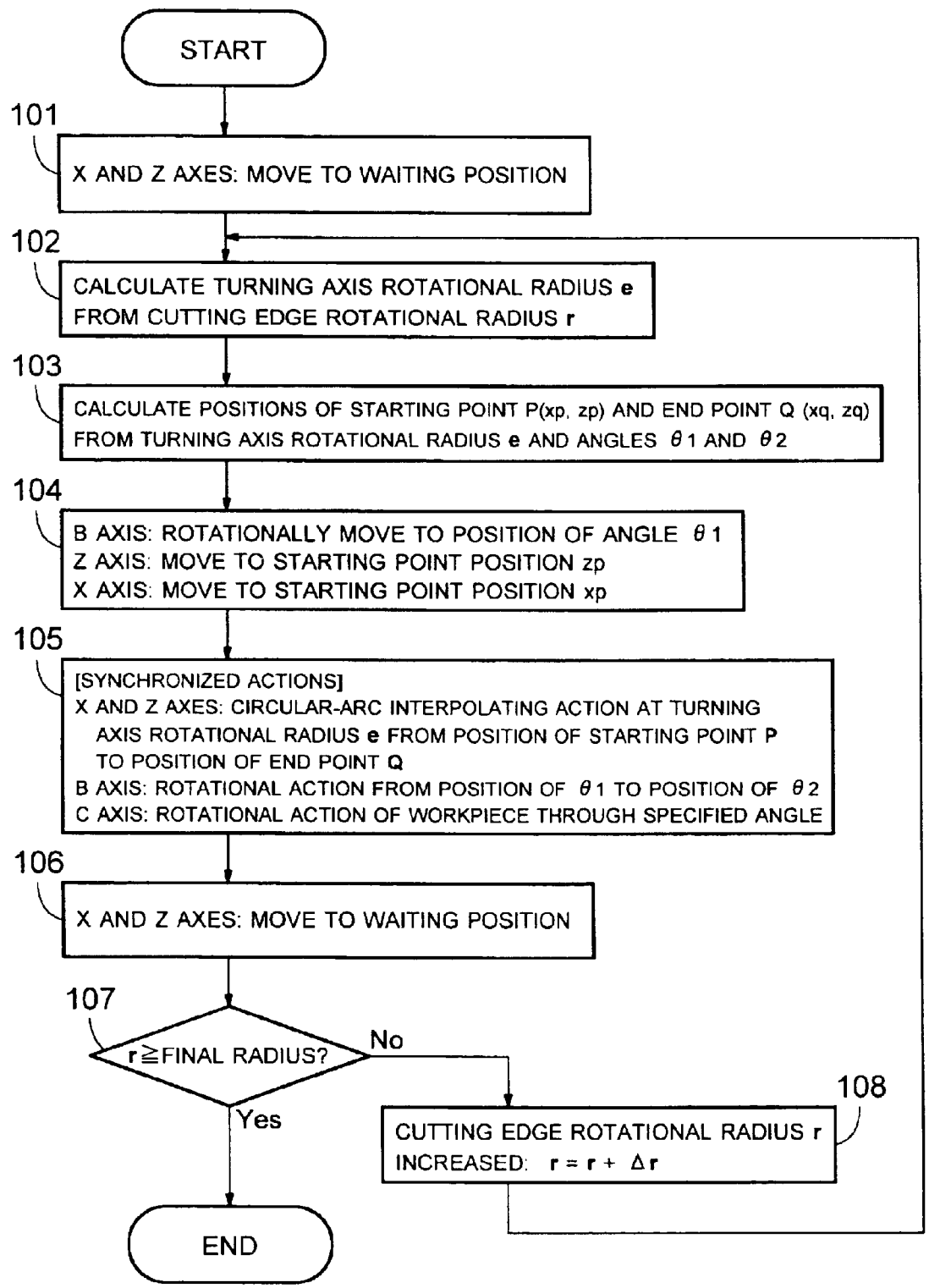
FIG. 11 is a flow chart which shows the procedure of the finishing machining of the helical groove.

FIG. 11 is a flow chart which shows the procedure of the finishing machining of the helical groove. In this flow chart, the radius of the circular arc described by the tip end of the cutting edge of the tool is indicated as the cutting edge rotational radius r, the radius of the circular-arc track that is to be described by the center of the turning axis 73 of the tool rest main body 71 is indicated as the turning axis rotational radius e, and the coordinates of the starting point P and end point Q of the circular-arc track are indicated as P(xp, zp) and Q(xq, zq). Furthermore, the data used to specify the position of the turning center M is preset.

First, in step 101, the X and Z axes of the tool rest main body 71 are controlled so that the tool rest main body 71 is moved into the waiting position. Next, in step 102, the turning axis rotational radius e is calculated from the cutting edge rotational radius r. Furthermore, as was indicated in the description of FIG. 8, the turning axis rotational radius e may also be calculated from the distance g between the tip end of the cutting edge of the tool and the center axial line of the workpiece in the closest state. Next, in step 103, the X and Z axis coordinates of the starting point P(xp, zp) and end point Q(xq, zq) of the circular-arc track that is to be described by the center of the turning axis 73 of the tool rest main body 71 are calculated from the turning axis rotational radius e and angles θ1 and θ2.

Then, in step 104, the turning tool rest 72 is caused to perform a B axis turning motion about the turning axis 73, and the rotational angle is taken as the rotational angle corresponding to the angle θ1. Furthermore, the Z axis of the tool rest main body 71 is controlled so that the tool rest main body 71 is moved into the starting point position zp. Moreover, the X axis of the tool rest main body 71 is controlled so that the tool rest main body 71 is moved into the starting position xp.

Next, in step 105, the following X and Z axis control, B axis control and C axis control are performed in synchronization. The X and Z axis control constitute a circular-arc interpolating action that causes the center of the turning axis 73 of the tool rest main body 71 to move along a circular arc with a radius of e from the staring point P to the end point Q. The B axis control constitutes a rotational action that causes the turning tool rest 72 to rotate about the turning axis 73 from the rotational angle corresponding to the angle θ1 to the rotational angle corresponding to the angle θ2. The C axis control constitutes a C axis rotational action that causes the workpiece 10 to rotate about the center axial line 10c from a specified starting angle to a specified ending angle. The starting angle and ending angle of the C axis rotation are set in accordance with the shape of the helical groove. The X and Z axis control, B axis control and C axis control of this step 105 are synchronous actions, and these respective axial controls are performed concurrently and in synchronization. Specifically, all of these axial operations are controlled so as to start at the same time and end at the same time.

Then, in step 106, the X and Z axes of the tool rest main body 71 are controlled so that the tool rest main body 71 is moved into the waiting position. Next, in step 107, a judgement is made as to whether or not the cutting edge rotational radius r has reached the final radius. Here, the "final radius" refers to the final cutting edge rotational radius that is reached when the finishing machining of the helical groove is performed with the cutting edge rotational radius successively increased. If the cutting edge rotational radius r has reached the final radius, the entire finishing machining procedure is ended; if the cutting edge rotational radius has not reached the final radius, the procedure proceeds to step 108. In step 108, the cutting edge rotational radius is increased by a specified amount Δr. Then, the procedure returns to step 102, and the steps from step 102 on are repeated. Specifically, finishing machining is performed with the cutting edge rotational radius successively increased in a stepwise manner, i.e., with the amount of cutting increased in a stepwise manner, until the cutting edge rotational radius r reaches the final radius.

Figure 12:
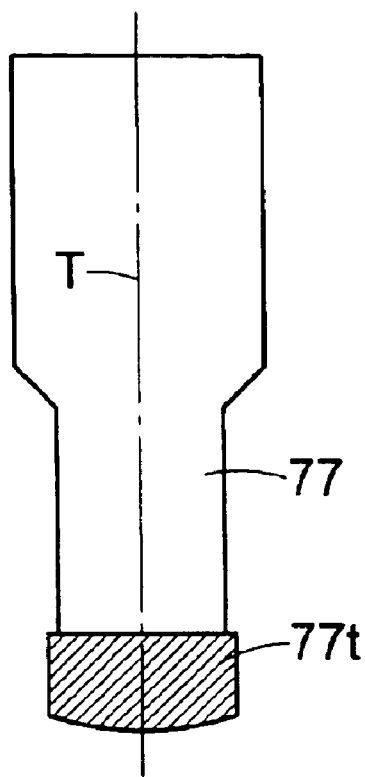
FIG. 12 is a diagram which shows the shape of the plate-form bite.
Figure 12:
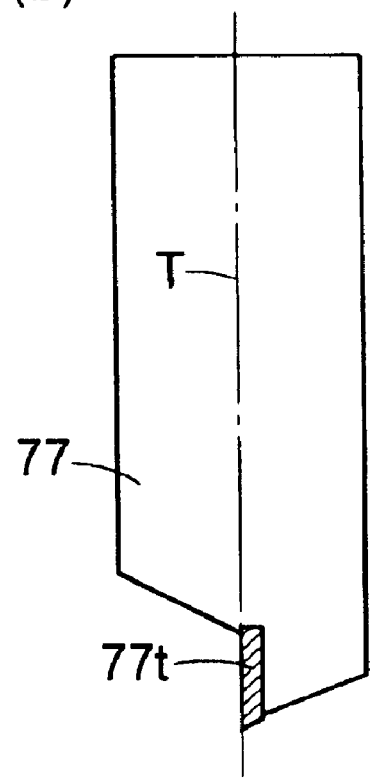
Figure 12:
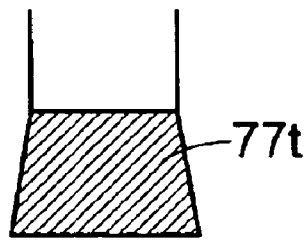
Figure 12:
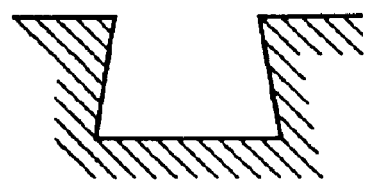

FIG. 12 is a diagram which shows the shape of the plate-form bite 77. FIG. 12(a) is a front view of the plate-form bite 77, and FIG. 12(b) is a side view of the plate-form bite 77. A plate-form tip 77t constituting a cutting edge is fastened to the tip end portion of the plate-form bite 77. The front surface of the tip 77t is a cutting surface. The tip 77t is attached so that the tip shows left-right symmetry with respect to the center axial line T of the tool as seen from the front, and so that the cutting surface passes through the center axial line T.

The shape of the cutting surface of the tip 77t is the cross-sectional shape of the groove that is being machined. Accordingly, if the cutting surface of the tip 77t is formed with a shape that spreads out on the tip end side as is shown in FIG. 12(c), a helical groove with a cross-sectional shape (such as that shown in FIG. 12(d)) that corresponds to this cutting surface shape can also be machined. Furthermore, helical grooves with other arbitrary cross-sectional shapes can also be machined by altering the cutting surface shape of the tip 77t.

Figure 13:
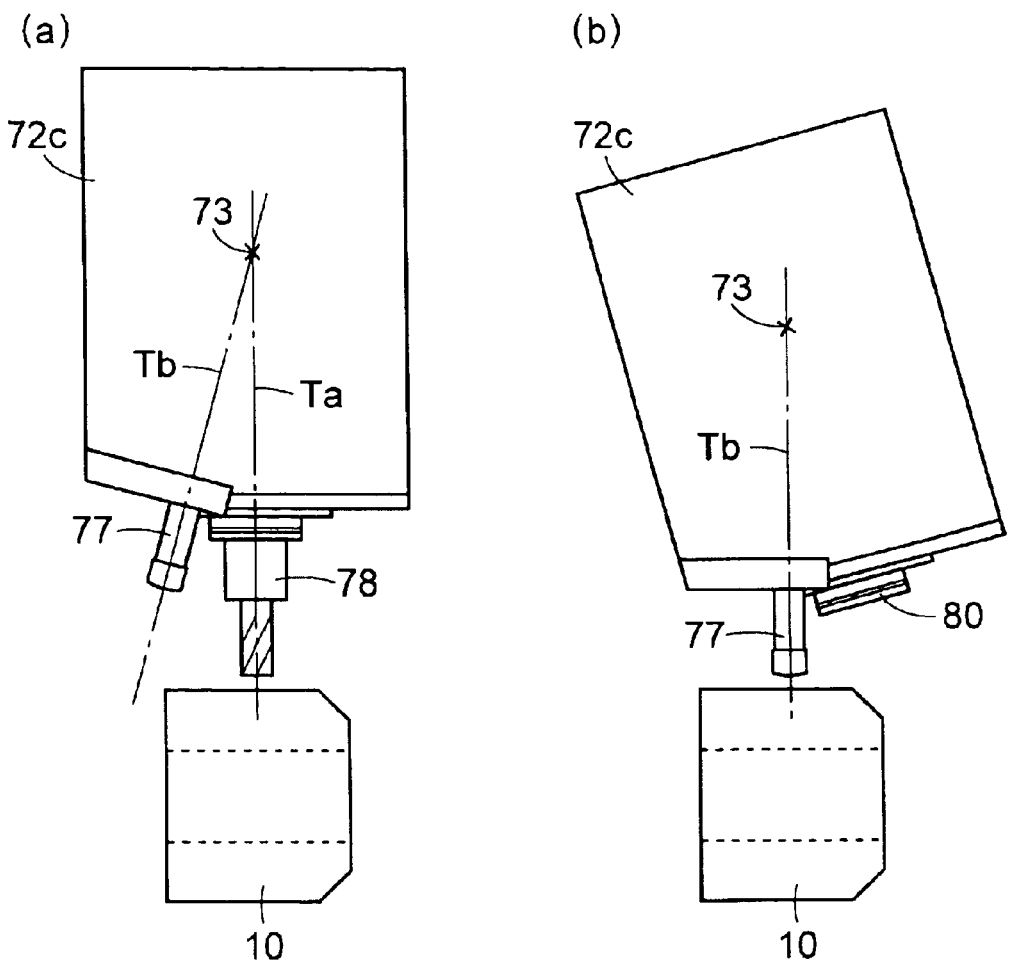
FIG. 13 is a diagram which shows the construction of another configuration of the turning tool rest.

FIG. 13 is a diagram which shows the construction of another configuration of the turning tool rest 72c. This turning tool rest 72c differs from the turning tool rest 72 shown in FIG. 1 in that the plate-form bite 77 is attached in fixed manner. Specifically, the plate-form bite 77 cannot be automatically replaced by the automatic tool changer 8; however, the plate-form bite 77 can be detachably attached to the turning tool rest 72c in a state in which the supporting rigidity is large. In FIG. 13(a), an end mill 78 which is a rotating tool is mounted in the tool mounting part which allows automatic tool replacement.

Here, the center axial line Ta of the end mill 78 and the center axial line Tb of the plate-form bite 77 both pass through the center of the turning axis 73, and intersect at a specified angle. This is done in order to prevent interference between the plate-form bite 77 and the workpiece during machining performed by the end mill 78. In this case of rough machining of the helical groove, the end mill 78 is mounted in the tool mounting part, and this machining is performed by the end mill 78, as is shown in FIG. 13(a).

In the case of the finishing machining of the helical groove, the end mill 78 is removed from the tool mounting part, a dummy tool 80 is mounted, and this machining is performed by the plate-form bite 77, as is shown in FIG. 13(*b*). The dummy tool 80 covers the tool mounting part, and is used to prevent foreign matter such as cutting debris, coolant and the like from entering the interior of the tool mounting part. The procedure of the finishing machining is performed in the same manner as that described in FIGS. 8 through 11.

Figure 14:
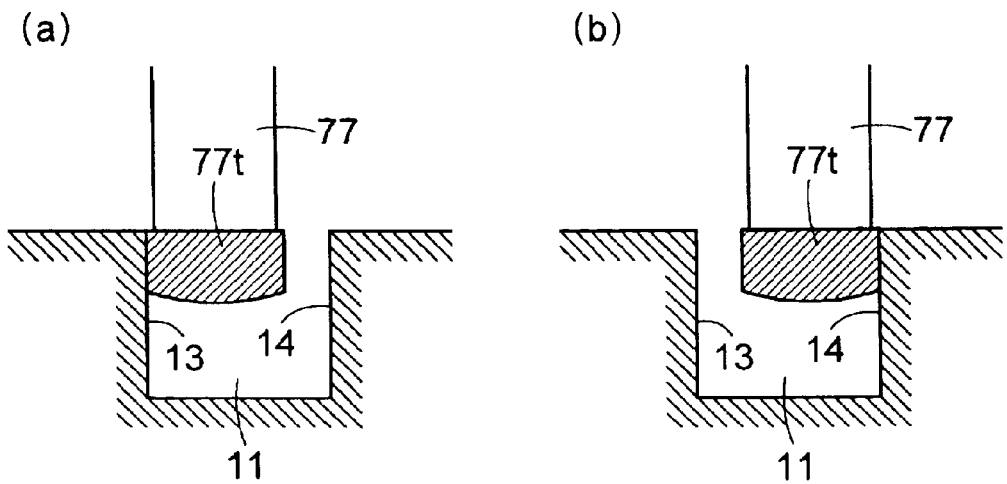
FIG. 14 is a diagram which shows the procedure whereby a helical groove with a groove width that differs from the width of the blade part of the plate-form bite is machined.

FIG. 14 is a diagram which shows the procedure whereby a helical groove with a groove width that differs from the width dimension of the blade part of the plate-form bite is machined. First, as is shown in FIG. 14(*a*), one side wall 13 of the helical groove 11 is machined by the plate-form bite 77. This is accomplished by causing the plate-form bite 77 to turn through a specified angle and causing the workpiece 10 to rotate through a specified angle as described in FIGS. 8 through 10. Next, the phase relationship of the turning of the plate-form bite 77 and the rotation of the workpiece 10 is slightly shifted, and the other side wall 14 of the helical groove 11 is machined by the plate-form bite 77 as shown in FIG. 14(*b*).

The phase between the turning of the plate-form bite 77 and the rotation of the workpiece 10 can be shifted by shifting the positions of the starting point P and end point Q of the circular-arc track that is to be described by the center of the turning axis 73 of the tool rest main body 71. Specifically, the positions of the angles θ1 and θ2 are shifted. Alternatively, the starting angle and ending angle of the rotation of the workpiece 10 may be shifted. By performing machining as shown in FIG. 14(*a*) and FIG. 14(*b*), it is possible to machine a helical groove which has a groove width that is wider than the width dimension of the blade part of the tip 77*t*.

In the present invention, as was described above, machining can easily be performed even in cases where helical grooves or the like with a complex shape are machined in the workpiece, by performing a synchronous operation in which a circular arc interpolating action, B axis turning action and C axis rotational action (provided in a common NC device) are combined. Furthermore, in regard to the shape of the helical groove as well, the machining of diverse shapes with high all-purpose utility can also be accomplished. Moreover, the machining of other portions of the workpiece can also be continuously performed before or after the machining of such a helical groove, so that the machining efficiency of the workpiece can be greatly improved.

[Merits of the Invention]

Since the present invention is constructed as described above, the present invention possesses the following merits.

The turning tool rest can be caused to perform a turning motion about an arbitrary position by concurrently and synchronously causing a turning motion and circular-arc motion of the turning tool rest, so that the machining of complex shapes in the workpiece can easily be performed.

The machining of helical grooves with complex shapes in the workpiece can easily be accomplished by concurrently and synchronously causing a turning motion and circular-arc motion of the turning tool rest and a rotational motion of the workpiece. In regard to the shape of such helical grooves as well, the machining of diverse shapes with high all-purpose utility can be accomplished. Furthermore, the machining of other portions of the workpiece can also be continuously performed before or after the machining of such a helical groove, so that the machining efficiency of the workpiece can be greatly improved.

What is claimed is:

1. A multi-function machine tool comprising:
    a main spindle which is rotatably disposed on a bed of the machine tool, and has workpiece attachment means for attaching the workpiece on the tip end thereof;
    a tool rest main body which is disposed movably in relative terms in a first linear direction parallel to the axial line of said main spindle, and in a second linear direction perpendicular to said first linear direction;
    a turning tool rest which is disposed on said tool rest main body, allows a mounting of a tool, and is disposed so that said turning tool rest can turn relative to said tool rest main body about a turning axis which has an axial line oriented in a direction that is perpendicular to both said first linear direction and said second linear direction; and
    control means for controlling the rotational motion of said main spindle about the axial line of said main spindle, a turning motion of said turning tool rest about the axial line of said turning axis, and the relative motion of said main spindle and said tool rest main body in said first linear direction and said second linear direction;
    wherein said control means can cause the turning motion of said turning tool rest about an arbitrary position that differs from the position of said turning axis by concurrently and synchronously causing the turning motion of said turning tool rest about said turning axis, and a circular-arc motion based on the relative motion of said tool rest main body in said first linear direction and said second linear direction.

2. The multi-function machine tool according to claim 1, wherein said tool rest main body is disposed movably relative to said bed in said first linear direction and said second linear direction.

3. The multi-function machine tool according to claim 1, wherein said control means can accomplish the machining-of-helical-grooves in said workpiece by causing the rotational motion of said workpiece about the axial line of said main spindle concurrently and in synchronization with said turning motion and said circular-arc motion.

4. The multi-function machine tool according to claim 3, wherein a plate-form cutting tool as a tool that performs the machining of said helical grooves capable of mounting said turning tool rest.

5. The multi-function machine tool according to claim 3, wherein
    a turning tool that performs turning on said workpiece capable of mounting said turning tool rest,
    and said control means can perform said helical groove machining and said turning of said workpiece as a continuous process.

6. The multi-function machine tool according to claim 5, wherein said turning tool rest comprises at least a first mounting part which detachably mounts said tool that performs said helical groove machining, and a second mounting part which detachably mounts a turning tool that performs said turning.

7. The multi-function machine tool according to claim 4, wherein a milling tool that performs rough machining of said helical grooves capable of mounting said turning tool rest.

8. The multi-function machine tool according to claim 7, wherein
    said turning tool rest comprises a rotatable tool main spindle,
    a tool mounting part is disposed on the tip end portion of said tool main spindle, and said tool mounting part is capable of mounting said milling tool and said plate-form cutting tool.

9. The multi-function machine tool according to claim 8, wherein said tool mounting part comprises rotation regulating means that regulate the rotation of said plate-form bite about said tool main spindle when said plate-form cutting tool is mounted.

10. The multi-function machine tool according to claim 1, wherein
said workpiece attachment means can attach said workpiece in a position that is separated by a specified distance from said main spindle toward the front on the axial line of said main spindle,
and said machine tool is devised so that interference of said turning tool rest with other members can be prevented by attaching said workpiece in a position that is separated by a specified distance toward the front of said main spindle.

11. The multi-function machine tool according to claim 3, wherein
said workpiece attachment means can attach said workpiece in a position that is separated by a specified distance from said main spindle toward the front on the axial line of said main spindle,
and said machine tool is devised so that interference of said turning tool rest with other members can be prevented by attaching said workpiece in a position that is separated by a specified distance toward the front of said main spindle.

12. A machining method of a multi-function machine tool comprising,
a main spindle which is rotatably disposed on a bed of the machine tool, and has workpiece attachment means for attaching the workpiece on the tip end thereof,
a tool rest main body which is disposed movably in relative terms in a first linear direction parallel to the axial line of said main spindle, and in a second linear direction perpendicular to said first linear direction,
and a turning tool rest which is disposed on said tool rest main body, which allows a mounting of a tool, and which is disposed so said turning tool rest can turn relative to said tool rest main body about a turning axis which has an axial line oriented in a direction that is perpendicular to both said first linear direction and said second linear direction, said machining method comprising the steps of:

setting a center position of a turning motion that said tool mounted on said turning tool rest is caused to perform, in an arbitrary position that differs from the position of said turning axis;
determining a circular-arc motion based on the relative motion of said tool rest main body in said first linear direction and said second linear direction that is necessary in order to cause said tool to perform said turning motion; and
performing the machining of said workpiece by causing said turning tool rest to perform said turning motion about said turning axis, causing said tool rest main body to perform said circular-arc motion concurrently and synchronously with said turning motion of said turning tool rest, and causing said tool to perform said turning motion about said center position.

13. The machining method of a multi-function machine tool according to claim 12, wherein said step of determining said circular-arc motion comprises the steps of:
setting a first dimension from the center position of the turning motion that said tool is caused to perform to the tip end position of said tool;
determining a second dimension from the center position of said turning motion to the center position of said turning axis; and
determining the radius, starting position and end position of said circular-arc motion from said second dimension and the starting angular position and end angular position of the turning motion that said tool is caused to perform.

14. The machining method of a multi-function machine tool according to claim 13, wherein the step of performing the machining on said workpiece is a step of forming a helical groove in said workpiece while said workpiece is caused to perform a rotational motion about the axial line of said main spindle concurrently and synchronously with said turning motion and said circular-arc motion.

15. The machining method of a multi-function machine tool according to claim 14, wherein the step of performing the machining on said workpiece is a step of performing said turning motion and said circular-arc motion which have different phase relationships with respect to the rotational motion of said workpiece, and performing groove machining with a groove width that is equal to or greater than the width of the blade part of said tool.

* * * * *